United States Patent
Lin et al.

(10) Patent No.: US 9,331,492 B2
(45) Date of Patent: May 3, 2016

(54) DETECTION CONTROL DEVICE AND METHOD THEREOF

(71) Applicant: Realtek Semiconductor Corp., Hsinchu (TW)

(72) Inventors: Chung-Chang Lin, Hsinchu County (TW); Chien-Wen Chen, Miaoli County (TW); Yi-Fan Tsai, Hsinchu (TW); Hong-Gi Wei, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 579 days.

(21) Appl. No.: 13/728,005

(22) Filed: Dec. 27, 2012

(65) Prior Publication Data

US 2013/0169053 A1 Jul. 4, 2013

(30) Foreign Application Priority Data

Dec. 28, 2011 (TW) .............................. 100149310 A

(51) Int. Cl.
| | |
|---|---|
| H02J 1/00 | (2006.01) |
| H02J 4/00 | (2006.01) |
| G06F 1/26 | (2006.01) |
| G06F 13/40 | (2006.01) |

(52) U.S. Cl.
CPC . *H02J 4/00* (2013.01); *G06F 1/266* (2013.01); *G06F 13/4081* (2013.01); *G06F 2213/0042* (2013.01); *Y10T 307/696* (2015.04)

(58) Field of Classification Search
USPC .................................... 307/66, 80, 87
See application file for complete search history.

(56) References Cited

U.S. PATENT DOCUMENTS

| 7,635,280 B1 * | 12/2009 | Crumlin et al. ............... 439/489 |
| 2007/0033308 A1 * | 2/2007 | Teng et al. ...................... 710/62 |
| 2008/0222438 A1 * | 9/2008 | Lin et al. ....................... 713/340 |

FOREIGN PATENT DOCUMENTS

| CN | 101944074 | 1/2011 |
| TW | 200830103 | 7/2008 |
| TW | 201014052 | 4/2010 |

* cited by examiner

*Primary Examiner* — Danny Nguyen
(74) *Attorney, Agent, or Firm* — Tarter Krinsky & Drogin LLP

(57) ABSTRACT

The present invention provides an auto-detection control apparatus, which receives an electric power from one of a system power source signal and an external device and performs a detection when coupled to the external device. The apparatus comprises a detection module, a power management module and a control module. The detection module generates a first result based on whether a first power signal from the external device exists, wherein the first result is related to whether the external device provides an electricity to itself. The power management module prevents a conflict between the system power source signal and the first power signal. The control module determines whether the electric power is supplied to the external device by the power management module based on the first result.

6 Claims, 3 Drawing Sheets

DETECTION CONTROL DEVICE AND METHOD THEREOF

CROSS-REFERENCE TO RELATED APPLICATION AND CLAIM OF PRIORITY

The present invention claims the benefits of priority from the Taiwanese Patent Application No. 100149310, filed on Dec. 28, 2011, the contents of the specification of which are hereby incorporated herein by reference.

FIELD OF THE INVENTION

The present invention relates to a detection control device and the detection method thereof, particularly an auto-detection device for avoiding conflictions of electric powers and the method thereof.

BACKGROUND OF THE INVENTION

In recent years, the Universal Serial Bus (USB) provides a universal interface for the connection and control between computers and various peripheral devices. Generally, the computer acts as a USB host device while the peripherals do as USB slave devices. The USB host provides electric power to the USB slaves, and transmits as well as receives data.

The specification of USB on the go (OTG) is provided for the connection and control among different types of peripheral devices. The main purpose of the emerging USB OTG specification is to allow two different USB peripheral devices connect to each other without via the computer and the host and slave relationship can be altered when necessary. There are four connecting pins in a traditional USB device, while the USB OTG which is required in an USB device complying with the USB OTG specification needs an additional ID pin for identifying the USB device as a host or a device.

According to prior art, there is a common issue of device burnt down or damaged due to power confliction between a device and an external device are coupled to each other without pre-determining the host-device relationship therebetween. Besides, the USB device connector or host connector utilized between two USB devices has to be employed to determine which one of the two USB devices is a USB host while the other one a USB device, so as to further manage the connection and control of the two USB devices, if anyone of the two USB devices does not comply with the USB OTG specification (i.e., lacking either USB OTG chip or ID pin or both).

Therefore, a non-USB OTG device according to the prior art needs to be equipped with different USB connectors to determine whether the device is a USB host or a USB device when being connected with other USB devices. There exists neither a universal connector nor an auto-detection method for such a purpose.

SUMMARY OF THE INVENTION

Accordingly, one of the objectives of the present invention is to provide an auto-detection control apparatus and the method thereof, so as to resolve the issue due to power confliction between a device and an external device are coupled to each other without pre-determining the host-device relationship therebetween, and to improve the deficiencies of the prior art.

Another one of the several objectives of the present invention is to provide an auto-detection control apparatus and the detection method thereof, which can make use of a single connector without any addition pin for auto-detection and connection as well as control, so as to improve the deficiencies of the prior art. The mentioned application shall not be limited to the use with USB devices.

According to one embodiment of the present invention, the present invention provides an auto-detection control apparatus, which receives an electric power from one of a system power source signal and an external device and performs a detection when coupled to the external device. The apparatus comprises a detection module, a power management module and a control module. The detection module generates a first result based on whether a first power signal from the external device exists, wherein the first result is related to whether the external device provides an electricity to itself. The power management module prevents a conflict between the system power source signal and the first power signal. The control module determines whether the electric power is supplied to the external device by the power management module based on the first result.

In accordance with another aspect of the present invention, the present invention provides a method for performing an auto-detection and a control when an auto-detection control device is coupled to an external device, wherein the auto-detection control device receives an electric power from one of a system power source signal and the external device, the method comprising steps of: generating a first result based on whether a first power signal from the external device exists, wherein the first result is related to whether the external device provides an electricity to itself; preventing a conflict between the system power source signal and the first power signal; and determining whether the electric power is supplied to the external device based on the first result.

In accordance with a further aspect of the present invention, the present invention provides an auto-detecting and controlling method for performing a detection when an auto-detection control device is coupled to an external device, wherein the auto-detection control device receives an electric power from one of a system power source signal and the external device, the method comprises steps of: detecting a first signal from the external device so as to determine that the external device is one of a master device and a slave device, and generating a third result based thereon; preventing a conflict between the system power source signal and a first power signal from the external device; and determining whether the system power source signal is supplied to the external device based on the third result.

The above objects and advantages of the present invention will be more readily apparent to those ordinarily skilled in the art after reading the details set forth in the descriptions and drawings that follow, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
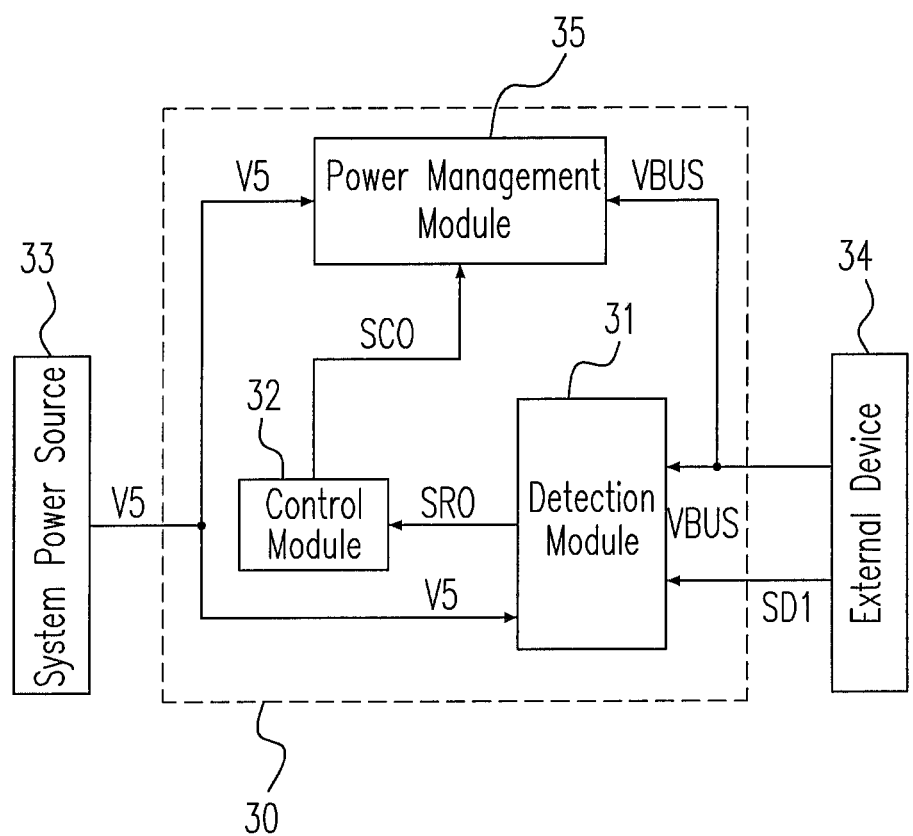
FIG. 1 is a schematic diagram showing an automatic detection control apparatus in accordance with one embodiment of the present invention.

Please refer to FIG. 1, which is a schematic diagram showing an automatic detection control apparatus 30 in accordance with one embodiment of the present invention. The automatic detection control apparatus 30 receives electric power from a system power source signal V5 provided by a system power source 33 or a first power signal VBUS provided by an external device 34, and performs detection when coupled to the external device 34. According to FIG. 1, the automatic detection control apparatus 30 includes a detection module 31, a control module 32 and a power management module 35. The detection module 31 is configured to detect whether the first power signal VBUS exists, so as to determine if the external device provides electric power to the automatic detection control apparatus 30. The detection module 31 also detects to determine whether the system power source signal V5 exists or not, detects a first signal SD1 from the external device 34, and generates a detection result SR0 based on what is (are) detected. The power management module 35 is configured to prevent conflict between the first power signal VBUS and the system power source signal V5. The control module 32 generates a control signal SC0 to control the power management module 35, determines whether the system power source signal V5 is provided to the external device 34, whether the power management module 35 provides electric power to the auto detection control apparatus 30 via the first power signal VBUS, and the external device 34 is a USB host or a USB device, based on the detection result SR0.

Figure 2:
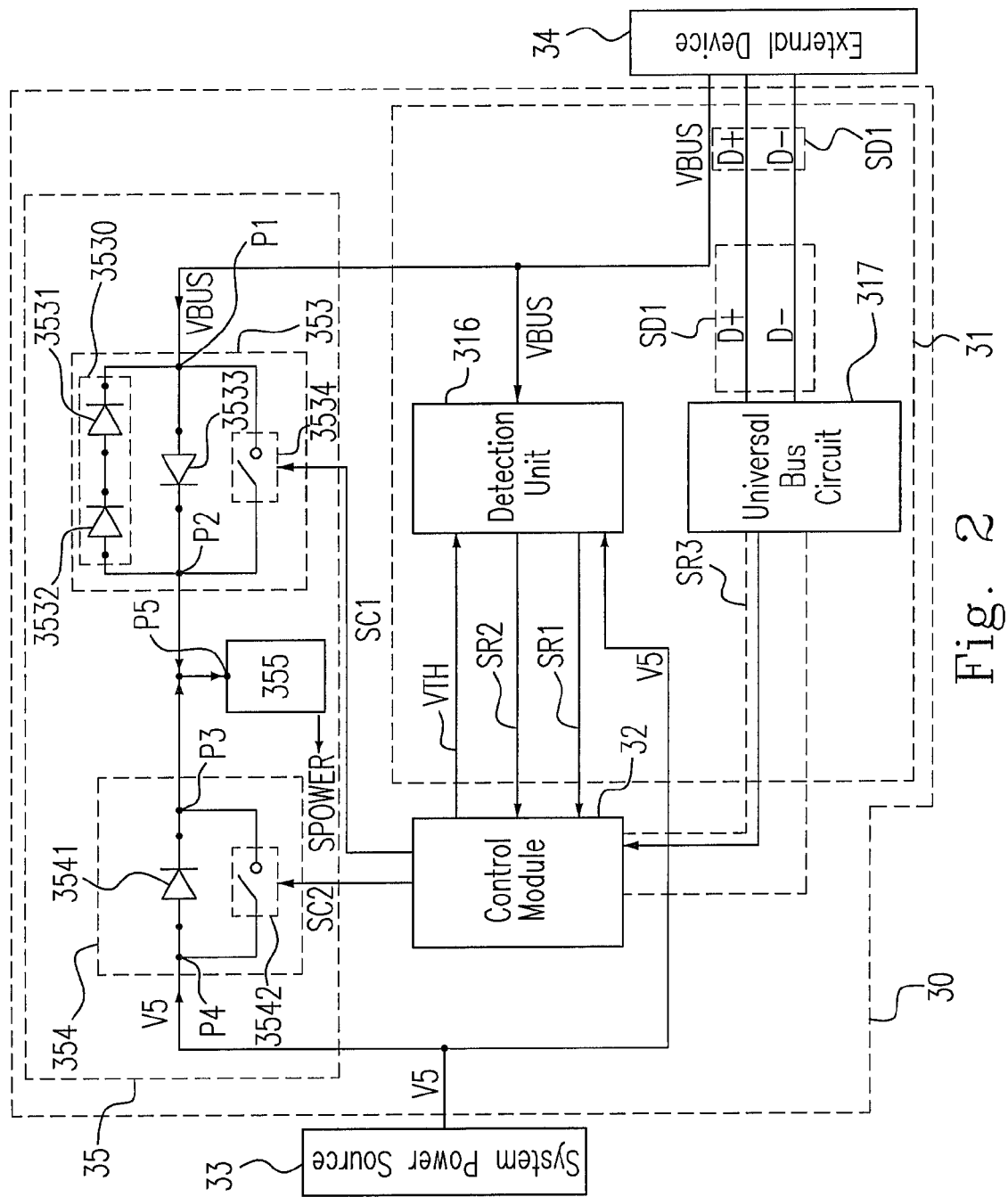
FIG. 2 is a schematic diagram showing an automatic detection control apparatus 30 in accordance with another embodiment of the present invention.

Please refer to FIG. 2, which is a schematic diagram showing an automatic detection control apparatus 30 in accordance with another embodiment of the present invention. Notably, although the present embodiment is introduced with the example in which both the automatic detection control apparatus 30 and the external device 34 are USB apparatus, the present invention shall not be limited to the application of USB systems.

The power status and the host-device relationship between the automatic detection control apparatus 30 and the external device 34 are not determined before the two devices are coupled to each other. Therefore, according to the present embodiment, power conflict between the power signals thereof, which are the first power signal VBUS and the system power source signal V5, shall be avoided in the first place. In one embodiment, a unidirectional voltage reduction unit (not shown) is employed to avoid the power conflict between the first power signal VBUS and the system power source signal V5, wherein the unidirectional voltage reduction unit is preferably a diode.

Referring to FIG. 2, the power management module 35 includes a first switch circuit 353, a second switch circuit 354 and a voltage stabilizing unit 355. The first switch circuit 353 includes a first terminal P1 coupled to a supply terminal (not shown) of the external device 34 supplying the first power signal VBUS and a second terminal P2. The second switch circuit 354 includes a third terminal P3 and a fourth terminal P4 coupled to a supply terminal (not shown) of the system power source providing the system power source signal V5. An input terminal P5 of the voltage stabilizing unit 315 is coupled to the second terminal P2 and the third terminal P3.

The first switch circuit 353 further includes a diode set 3530, which has a first diode 3531 and a second diode 3532, a third diode 3533 and a first switch 3534, wherein the diode set 3530 and the third diode 3533 are disposed in parallel. The second switch circuit 354 includes a fourth diode 3541 and a second switch 3542 disposed in parallel. When the first power signal VBUS and the system power source signal V5 exist simultaneously, for instance V5 and VBUS both equals to 5 volt, and the operation voltage required by the auto detection control apparatus 30 is 3.3 volt, the voltage of the system power source signal V5 is reduced by the fourth diode 3541 while that of the first power signal VBUS is reduced by the third diode 3533, so as to avoid power conflict therebetween and prevent components of the device from burnt or damaged. Meanwhile, the voltage stabilizing unit 355 either shift or stabilize the system power source signal V5 or the first power signal VBUS at the input terminal P5 into an operation voltage SPOWER being 3.3 volt to supply the detection module 31 or the control module 32 during the initial period. The initial condition of the first and the second switches 3534, 3542 are switched off. In the descriptions of the present specification, the existing of a signal means the signal is detected and the voltage of the signal is sufficient to keep the relevant circuit or module operated.

In accordance with an embodiment, the detection module 31 includes a detection unit 316 for detecting the first power signal VBUS from the external device 34 and generating a first result SR1. The detection module generates the first result SR1 based on whether the first power signal VBUS from the external device 34 provides electric power to the detection module 31. Firstly, assuming the system power source signal V5 exists and the first power signal VBUS=5 volt, which is higher than the operation voltage SPOWER, the method of voltage division or reduction voltage can be adopted. If the first power signal VBUS is divided to half, which is 2.5 volt, and then is compared with a first threshold value VTH, says 2 volt for example, the first power signal VBUS is deemed existing since the voltage of the signal after voltage division is higher than the first threshold value VTH. Accordingly, the external device is considered supplying electric power to itself.

If the first power signal VBUS does not exist, the voltage detected at the supply terminal of the external device 34 is in fact the system power source signal V5 after reduction voltage by the three diodes 3541, 3532 and 3531 (for example, 0.7 volt times 3 equals 2.1 volt). If the voltage value of the system power source signal V5 is 5 volt, the voltage after the reduction via the three diodes 3541, 3532 and 3531 should be 2.9 volt, and therefore the voltage value of the signal after the voltage division is 1.45 volt, which is less than the first threshold value VTH. Thus, the first threshold value VTH is deemed not existing, and the external device is considered not supplying electric power to itself. Notably, the values of the operation voltage SPOWER and the first power signal VBUS, the method of voltage division or reduction voltage, the number of diodes in the circuit and connections thereof can be adjusted based on actual applications.

The control module 32 determines whether the electric power is supplied to the external device 34 by the power management module 35 based on the first result SR1. When the external device 34 does not provide electric power for itself, the control module 32 switches on the first switch 3534 and the second switch 3542 by sending control signals SC1, SC2 to the first switch circuit 353 and the second switch circuit 354 respectively, so as to provide electric power to the external device 34 with the system power source signal V5 without the voltage reduction by the diodes 3541, 3532 and 3531 and to generate the operation voltage SPOWER to supply the electric power for the automatic detection control apparatus 30. On the other hand, when the external device 34 provides electric power for itself, the control module 32 switches off the first switch 3534 while switches on the second switch 3542 by sending control signals SC1, SC2 to the first switch circuit 353 and the second switch circuit 354 respectively, so as to prevent the conflict between the system power source signal V5 and the first power signal VBUS and allow the operation voltage SPOWER generated from the system power source signal V5 to supply to the automatic detection control apparatus 30.

In accordance with another embodiment of the present invention, the detection module 31 further generates a second result SR2 based on whether the system power source signal V5 exists, and the control module 32 determines whether the electric power is supplied to the detection control apparatus 30 by the power management module 35 via the first power signal VBUS based on the second result SR2. If the system power source signal V5 does not exist, the first power signal VBUS exists under a reasonable condition, wherein the first power signal VBUS goes through the voltage reduction via the third diode 3533 and the power switching or voltage stabilization via the voltage stabilization unit 355, and results in an operation voltage SPOWER of 3.3 volt, so as to provide electric power to the detection module 31 and the control module 32 during the initial period. The method of determining the existence of the first power signal VBUS by employing voltage division and the threshold according to the embodiment set forth in the preceding paragraphs can be applicable for determining the existence of the system power source signal V5, and therefore there is no need to repeat.

If the system power source signal V5 does not exist, the control module 32 switches on the first switch 3534 and switches off the second switch 3542 by sending control signals SC1, SC2 to the first switch circuit 353 and the second switch circuit 354 respectively, so as to generate the operation voltage SPOWER with the first power signal VBUS without the voltage reduction by the diode 3533 to provide electric power to the automatic detection control apparatus 30.

In accordance with a further embodiment of the present invention, the detection module 31 further includes a universal bus circuit 317, which detects a first signal SD1 from the external device 34 to generate a third result SR3. The universal bus circuit 317 determines that the external device 34 is a USB host or a USB device based on the first signal SD1, so as to generate the third result SR3. Taking USB device as an example, the first signal SD1 is preferably a differential signal, which includes signals D+ and D−. When a corresponding signal indicating the external device 34 be a USB device is detected, the detection module 31 transmits a signal DVICE_CONNECT=1 to the control module 32. Otherwise, the external device 34 shall be a USB host, and the detection module 31 transmits a signal DVICE_CONNECT=0.

A USB host usually provide electric power to itself (i.e., VBUS exists), so the USB device usually needs electric power from the USB host (i.e., VBUS does not exist). According to yet a further embodiment of the present invention, the control module 32 may further determines whether the electric power is supplied to the external device 43 by the power management module 35 via the system power source signal V5 based on the first and the third results SR1, SR3, or adjusts the first threshold value based on the third result SR3. In another embodiment, the control module 32 can only determine whether the system power source signal V5 provides electric power to the external device 34 based on the third result SR3.

Figure 3:
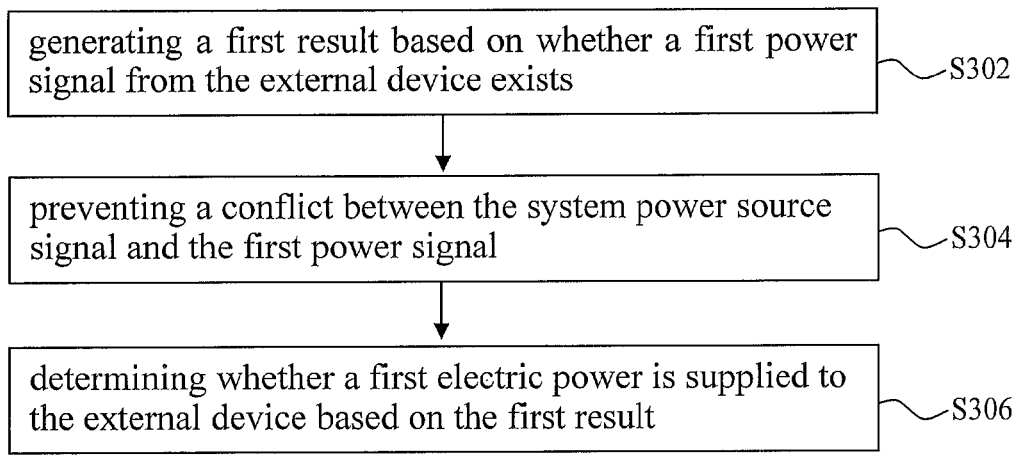
FIG. 3 is a flow chart showing steps of a detection and control method according to one embodiment of the present invention.
Figure 4:
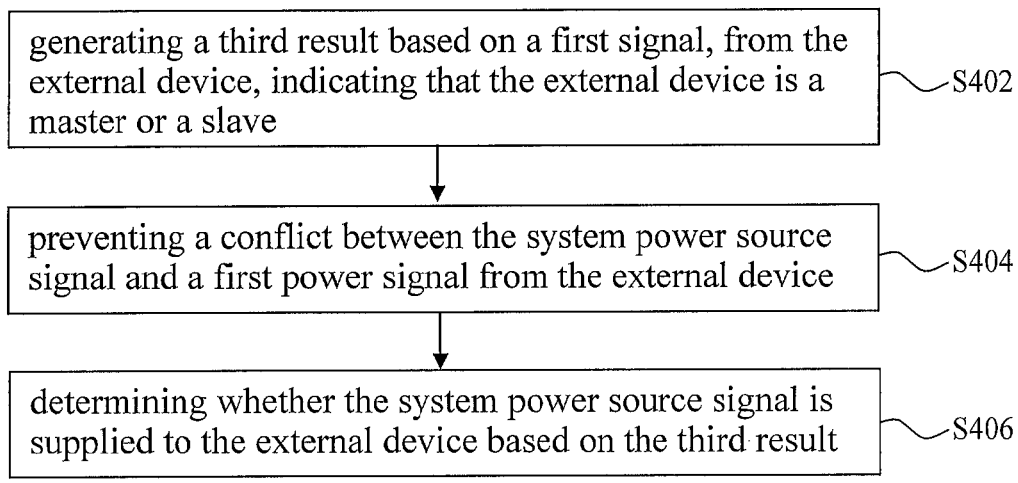
FIG. 4 is a flow chart showing steps of a detection and control method according to one embodiment of the present invention.

Please refer to FIG. 3, which shows a detection and control method according to one embodiment of the present invention. The method is for performing a detection and a control when an automatic detection control device is coupled to an external device, wherein the automatic detection control device receives electric power from a system power source or an external device. The method comprises the following steps:

Step S302: Generating a first result based on whether a first power signal from the external device exists Step S304: Preventing a conflict between a system power source signal from the system power source and a first power signal from the external device Step S306: Determining whether the electric power is supplied to the external device based on the first result According to another embodiment of the present invention, the method may further comprises the following step:

Step S308: Generating a second result based on whether the system power source signal exists and determining whether the electrical power is supplied to the detection control apparatus via the first power signal based on the second result According to a further embodiment of the present invention, the method may further comprises the following step:

Step S310: Generating a third result based on a first signal, from the external device, indicating that the external device is one of a USB host or a USB device According to a further embodiment of the present invention, the method may further comprises the following step:

Step S312: Determining whether the electric power is supplied to the external device by the power management module via the system power source signal based on the first and the third results According to a further embodiment of the present invention, the method may further comprises the following step:

Step S314: Preventing a conflict between the system power source signal and the first power signal by using a unidirectional voltage reduction unit and switching on a switch connected to the unidirectional voltage reduction unit in parallel so as to provide the electric power to the external device Please refer to FIG. 4, which shows a detection and control method according to one embodiment of the present invention. The method is for performing a detection and a control when an automatic detection control device is coupled to an external device, wherein the automatic detection control device receives electric power from a system power source or an external device. The method comprises the following steps:

Step S402: Generating a first result based on whether a first signal from an external device exists, wherein the first signal indicates that the external device is one of a host and a device Step S404: Preventing a conflict between a system power source signal from the system power source and a first power signal from the external device Step S406: Determining whether the system power source signal is supplied to the external device based on the first result According to a further embodiment of the present invention, the method may further comprises the following steps:

Step S408: Preventing a conflict between the system power source signal and the first power signal by using a unidirectional voltage reduction unit and switching on a switch connected to the unidirectional voltage reduction unit in parallel so as to provide the electric power to the external device According to a further embodiment of the present invention, the method may further comprises the following steps:

Step S410: Generating a second result based on whether the system power source signal exists and determining whether the electrical power is supplied to the detection control apparatus via the first power signal based on the second result Noted that there may be no need to follow the sequence of those steps shown in FIGS. 3 and 4 when applying the method provided by the present invention, and some other steps may be inserted to the flow as appropriated.

Based on the abovementioned, the deficiencies of the prior art can be resolved based on the detection control apparatus and the method thereof according to the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

EMBODIMENTS

1. An auto-detection control apparatus receiving an electric power from one of a system power source signal and an external device, and performing a detection when coupled to the external device, comprising:
   a detection module generating a first result based on whether a first power signal from the external device exists, wherein the first result is related to whether the external device provides an electricity to itself;
   a power management module preventing a conflict between the system power source signal and the first power signal; and
   a control module determining whether the electric power is supplied to the external device by the power management module based on the first result.
2. The apparatus of embodiment 1, wherein the detection module further generates a second result based on whether a system power source signal from the system power source exists, and the control module further determines whether the electric power is supplied to the detection control apparatus by the power management module via the first power signal based on the second result.
3. The apparatus of embodiment 2, wherein the detection module further generates a third result based on a first signal from the external device.
4. The apparatus of embodiment 3, wherein the control module further determines whether the electric power is supplied to the external device by the power management module via the system power source signal based on the first and the third results.
5. The apparatus of embodiment 1, wherein the detection module obtains the first result based on a comparison between a threshold value obtained from one of the system power source signal and the first power signal and a voltage value detected at a supply end of the external device supplying the first power signal.
6. The apparatus of embodiment 1, wherein the power management module comprises:
   a unidirectional voltage reduction unit preventing the conflict between the system power source signal and the first power signal; and
   a switch connected to the unidirectional voltage reduction unit in parallel, and switched on when the control module determines that the electric power is supplied to the external device by the power management module via the system power source signal.
7. The apparatus of embodiment 6, wherein the system power source signal is supplied to the external device when the switch is on.
8. A method for performing an auto-detection and a control when an auto-detection control device is coupled to an external device, wherein the auto-detection control device receives an electric power from one of a system power source signal and the external device, the method comprising steps of:
   generating a first result based on whether a first power signal from the external device exists, wherein the first result is related to whether the external device provides an electricity to itself;
   preventing a conflict between the system power source signal and the first power signal; and
   determining whether the electric power is supplied to the external device based on the first result.
9. The method of embodiment 8, further comprising steps of:
   generating a second result based on whether the system power source signal exists; and
   determining whether the electrical power is supplied to the detection control apparatus via the first power signal based on the second result.
10. The method of embodiment 8, further comprising a step of:
    generating a third result based on a first signal, from the external device, indicating that the external device is one of a USB host or a USB device.
11. The method of embodiment 10, further comprising a step of:
    determining whether the electric power is supplied to the external device based on the first and the third results.
12. The method of embodiment 9, further comprising steps of:
    preventing the conflict between the system power source signal and the first power signal by using a unidirectional voltage reduction unit; and
    switching on a switch connected to the unidirectional voltage reduction unit in parallel so as to provide the electric power to the external device.
13. An auto-detecting and controlling method for performing a detection when an auto-detection control device is coupled to an external device, wherein the auto-detection control device receives an electric power from one of a system power source signal and the external device, the method comprises steps of:
    detecting a first signal from the external device so as to determine that the external device is one of a master device and a slave device, and generating a third result based thereon;
    preventing a conflict between the system power source signal and a first power signal from the external device; and
    determining whether the system power source signal is supplied to the external device based on the third result.
14. The method of embodiment 13, further comprising steps of:
    preventing the conflict between the system power source signal and the first power signal by using a unidirectional voltage reduction unit; and
    switching on a switch coupled to the unidirectional voltage reduction unit so as to provide the system power source signal to the external device.
15. The method of embodiment 13, further comprising steps of:
    generating a second result based on whether the system power source signal exists; and determining whether the electric power is supplied to the auto-detection control device via the first power source signal based on the second result.

What is claimed is:

1. An auto-detection control apparatus receiving an electric power from one of a system power source signal and an external device, and performing a detection when coupled to the external device, comprising:
   a detection module generating a first result based on whether a first power signal from the external device exists and generating a second result based on whether a system power source signal from the system power source exists, wherein the first result is related to whether the external device provides an electricity to itself;
   a power management module preventing a conflict between the system power source signal and the first power signal; and
   a control module determining whether the electric power is supplied to the external device by the power management module based on the first result, and determining whether the electric power is supplied to the detection control apparatus by the power management module via the first power signal based on the second result.

2. An apparatus as claimed in claim 1, wherein the detection module further generates a third result based on a first signal from the external device.

3. An apparatus as claimed in claim 2, wherein the control module further determines whether the electric power is supplied to the external device by the power management module via the system power source signal based on the first and the third results.

4. An auto-detection control apparatus receiving an electric power from one of a system power source signal and an external device, and performing a detection when coupled to the external device, comprising:
   a detection module generating a first result based on whether a first power signal from the external device exists, wherein the first result is related to whether the external device provides an electricity to itself;
   a power management module preventing a conflict between the system power source signal and the first power signal; and
   a control module determining whether the electric power is supplied to the external device by the power management module based on the first result;
   wherein the detection module obtains the first result based on a comparison between a threshold value obtained from one of the system power source signal and the first power signal and a voltage value detected at a supply end of the external device supplying the first power signal.

5. An auto-detection control apparatus receiving an electric power from one of a system power source signal and an external device, and performing a detection when coupled to the external device, comprising:
   a detection module generating a first result based on whether a first power signal from the external device exists, wherein the first result is related to whether the external device provides an electricity to itself;
   a power management module preventing a conflict between the system power source signal and the first power signal; and
   a control module determining whether the electric power is supplied to the external device by the power management module based on the first result;
   wherein the power management module comprises:
      a unidirectional voltage reduction unit preventing the conflict between the system power source signal and the first power signal; and
      a switch connected to the unidirectional voltage reduction unit in parallel, and switched on when the control module determines that the electric power is supplied to the external device by the power management module via the system power source signal.

6. An apparatus as claimed in claim 5, wherein the system power source signal is supplied to the external device when the switch is on.

* * * * *